(12) United States Patent
Narayana Gowda

(10) Patent No.: US 12,314,535 B2
(45) Date of Patent: May 27, 2025

(54) METHOD AND APPARATUS FOR SNAPSHOT MANAGEMENT

(71) Applicant: Dell Products L.P., Round Rock, TX (US)

(72) Inventor: Shivasharan Narayana Gowda, Kolar (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/328,269

(22) Filed: Jun. 2, 2023

(65) Prior Publication Data

US 2024/0402879 A1    Dec. 5, 2024

(51) Int. Cl.
| G06F 3/00 | (2006.01) |
| G06F 3/0482 | (2013.01) |
| G06F 3/0484 | (2022.01) |
| G06F 12/02 | (2006.01) |

(52) U.S. Cl.
CPC .......... *G06F 3/0482* (2013.01); *G06F 3/0484* (2013.01); *G06F 12/023* (2013.01); *G06F 2212/1044* (2013.01)

(58) Field of Classification Search
CPC .... G06F 3/0482; G06F 3/0484; G06F 12/023; G06F 2212/1044
See application file for complete search history.

(56) References Cited

U.S. PATENT DOCUMENTS

| 10,324,806 B1* | 6/2019 | Kucherov | G06T 11/206 |
| 2012/0317079 A1* | 12/2012 | Shoens | G06F 11/2094 |
| | | | 707/E17.007 |
| 2016/0099844 A1* | 4/2016 | Colgrove | G06F 11/3034 |
| | | | 715/736 |
| 2020/0133560 A1* | 4/2020 | Wang | G06F 3/0671 |
| 2023/0421514 A1* | 12/2023 | An | H04L 51/04 |

* cited by examiner

*Primary Examiner* — Brett A Feeney
*Assistant Examiner* — Andrew Chung
(74) *Attorney, Agent, or Firm* — Daly, Crowley, Mofford & Durkee, LLP.

(57) ABSTRACT

A method comprising: displaying, in a user interface, a snapshot list, the snapshot list identifying a plurality of snapshots of a volume or a group of volumes; detecting a first user input selecting one or more of the snapshots of the plurality of snapshots; calculating a total amount of storage space that would be freed if the selected snapshots were to be deleted; and displaying, in the user interface, an indication of the total amount of storage space that would be freed if the selected snapshots were to be deleted.

20 Claims, 14 Drawing Sheets

TIME = T$_1$

| VOLUME 210 | | | | |
|---|---|---|---|---|
| LBA 1 ->PA 1 | LBA 2 ->PA 2 | LBA 3 ->PA 3 | LBA 4 ->PA 4 | LBA 5 ->PA 5 |

TIME = T$_2$

| VOLUME 210 | | | | |
|---|---|---|---|---|
| LBA 1 ->PA 1 | LBA 2 ->PA 2 | LBA 3 ->PA 3 | LBA 4 ->PA 4 | LBA 5 ->PA 5 |

| SNAP 1 | | | | |
|---|---|---|---|---|
| BLOCK 1 ->PA 1 | BLOCK 2 ->PA 2 | BLOCK 3 ->PA 3 | BLOCK 4 ->PA 4 | BLOCK 5 ->PA 5 |

TIME = T$_3$

| VOLUME 210 | | | | |
|---|---|---|---|---|
| LBA 1 ->PA 6 | LBA 2 ->PA 2 | LBA 3 ->PA 3 | LBA 4 ->PA 4 | LBA 5 ->PA 5 |

| SNAP 1 | | | | |
|---|---|---|---|---|
| BLOCK 1 ->PA 1 | BLOCK 2 ->PA 2 | BLOCK 3 ->PA 3 | BLOCK 4 ->PA 4 | BLOCK 5 ->PA 5 |

FIG. 4A

TIME = T$_4$

| VOLUME 210 | | | | |
|---|---|---|---|---|
| LBA 1 ->PA 6 | LBA 2 ->PA 2 | LBA 3 ->PA 3 | LBA 4 ->PA 4 | LBA 5 ->PA 5 |

| SNAP 2 | | | | |
|---|---|---|---|---|
| BLOCK 1 ->PA 6 | BLOCK 2 ->PA 2 | BLOCK 3 ->PA 3 | BLOCK 4 ->PA 4 | BLOCK 5 ->PA 5 |

| SNAP 1 | | | | |
|---|---|---|---|---|
| BLOCK 1 ->PA 1 | BLOCK 2 ->PA 2 | BLOCK 3 ->PA 3 | BLOCK 4 ->PA 4 | BLOCK 5 ->PA 5 |

TIME = T$_5$

| VOLUME 210 | | | | |
|---|---|---|---|---|
| LBA 1 ->PA 6 | LBA 2 ->PA 7 | LBA 3 ->PA 3 | LBA 4 ->PA 4 | LBA 5 ->PA 5 |

| SNAP 2 | | | | |
|---|---|---|---|---|
| BLOCK 1 ->PA 6 | BLOCK 2 ->PA 2 | BLOCK 3 ->PA 3 | BLOCK 4 ->PA 4 | BLOCK 5 ->PA 5 |

| SNAP 1 | | | | |
|---|---|---|---|---|
| BLOCK 1 ->PA 1 | BLOCK 2 ->PA 2 | BLOCK 3 ->PA 3 | BLOCK 4 ->PA 4 | BLOCK 5 ->PA 5 |

FIG. 4B

TIME = T₆

| VOLUME 210 | | | | |
|---|---|---|---|---|
| LBA 1 | LBA 2 | LBA 3 | LBA 4 | LBA 5 |
| ->PA 6 | ->PA 7 | ->PA 3 | ->PA 4 | ->PA 5 |

| SNAP 3 | | | | |
|---|---|---|---|---|
| BLOCK 1 | BLOCK 2 | BLOCK 3 | BLOCK 4 | BLOCK 5 |
| ->PA 6 | ->PA 7 | ->PA 3 | ->PA 4 | ->PA 5 |

| SNAP 2 | | | | |
|---|---|---|---|---|
| BLOCK 1 | BLOCK 2 | BLOCK 3 | BLOCK 4 | BLOCK 5 |
| ->PA 6 | ->PA 2 | ->PA 3 | ->PA 4 | ->PA 5 |

| SNAP 1 | | | | |
|---|---|---|---|---|
| BLOCK 1 | BLOCK 2 | BLOCK 3 | BLOCK 4 | BLOCK 5 |
| ->PA 1 | ->PA 2 | ->PA 3 | ->PA 4 | ->PA 5 |

FIG. 4C

TIME = T₇

| VOLUME 210 | | | | |
|---|---|---|---|---|
| LBA 1 | LBA 2 | LBA 3 | LBA 4 | LBA 5 |
| ->PA 6 | ->PA 8 | ->PA 3 | ->PA 4 | ->PA 5 |

| SNAP 3 | | | | |
|---|---|---|---|---|
| BLOCK 1 | BLOCK 2 | BLOCK 3 | BLOCK 4 | BLOCK 5 |
| ->PA 6 | ->PA 7 | ->PA 3 | ->PA 4 | ->PA 5 |

| SNAP 2 | | | | |
|---|---|---|---|---|
| BLOCK 1 | BLOCK 2 | BLOCK 3 | BLOCK 4 | BLOCK 5 |
| ->PA 6 | ->PA 2 | ->PA 3 | ->PA 4 | ->PA 5 |

| SNAP 1 | | | | |
|---|---|---|---|---|
| BLOCK 1 | BLOCK 2 | BLOCK 3 | BLOCK 4 | BLOCK 5 |
| ->PA 1 | ->PA 2 | ->PA 3 | ->PA 4 | ->PA 5 |

FIG. 4D

```
312
host@host:~$ delete(snap_1, snap_3)    /-562
                                       /-564
host@host:~$ deleting these snapshots will free 40MB. Do
you want to commit the deletion? (y/n)

host@host:~$ y    /-566
                                       /-568
host@host:~$ deletion completed. bye
```

METHOD AND APPARATUS FOR SNAPSHOT MANAGEMENT

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: displaying, in a user interface, a snapshot list, the snapshot list identifying a plurality of snapshots of a volume or a group of volumes; detecting a first user input selecting one or more of the snapshots of the plurality of snapshots; calculating a total amount of storage space that would be freed if the selected snapshots were to be deleted; and displaying, in the user interface, an indication of the total amount of storage space that would be freed if the selected snapshots were to be deleted.

According to aspects of the disclosure, a system is provided, comprising: a memory; and at least one processor that is operatively coupled to the memory, the at least one processor being configured to perform the operations of: displaying, in a user interface, a snapshot list, the snapshot list identifying a plurality of snapshots of a volume or a group of volumes; detecting a first user input selecting one or more of the snapshots of the plurality of snapshots; calculating a total amount of storage space that would be freed if the selected snapshots were to be deleted; and displaying, in the user interface, an indication of the total amount of storage space that would be freed if the selected snapshots were to be deleted.

According to aspects of the disclosure, a non-transitory computer-readable medium is provided that stores one or more processor instructions, which, when executed by at least one processor, cause the at least one processor to perform the operations of: displaying, in a user interface, a snapshot list, the snapshot list identifying a plurality of snapshots of a volume or a group of volumes; detecting a first user input selecting one or more of the snapshots of the plurality of snapshots; calculating a total amount of storage space that would be freed if the selected snapshots were to be deleted; and displaying, in the user interface, an indication of the total amount of storage space that would be freed if the selected snapshots were to be deleted.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 4A is a diagram illustrating aspects of the system of FIG. 1, according to aspects of the disclosure;

FIG. 4B is a diagram illustrating aspects of the system of FIG. 1, according to aspects of the disclosure;

FIG. 4C is a diagram illustrating aspects of the system of FIG. 1, according to aspects of the disclosure;

FIG. 4D is a diagram illustrating aspects of the system of FIG. 1, according to aspects of the disclosure;

DETAILED DESCRIPTION

Figure 1:
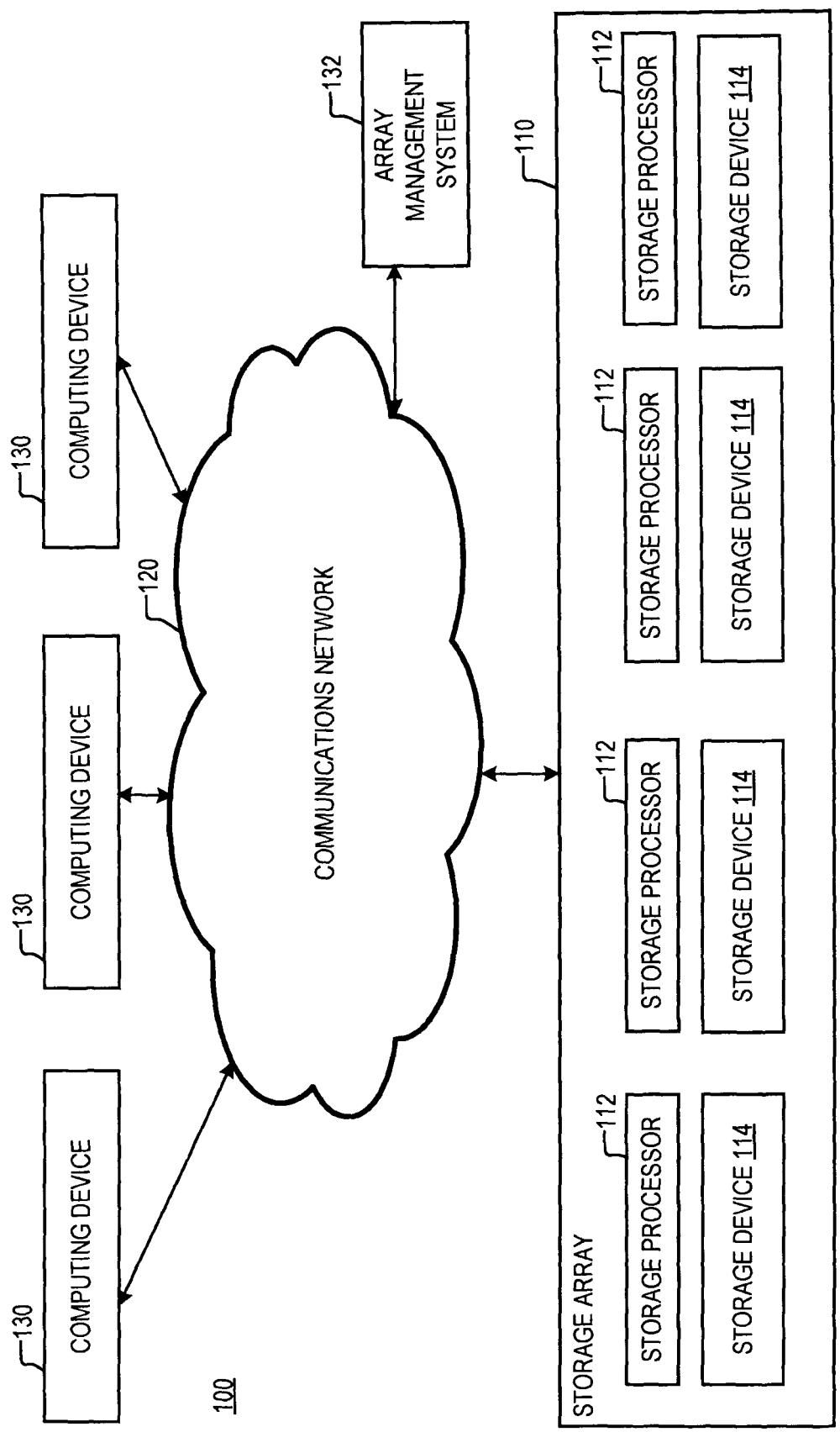
FIG. 1 is a diagram of an example of a system, according to aspects of the disclosure.

In storage systems where the snapshots are created seamlessly, tracking storage space consumption and performing storage space cleanup is difficult for storage administrators. Most of the time, a storage administrator would be required to free a specific amount of space on the storage system by expiring some of the snapshots. In such circumstances, the deletion of snapshots would be performed to free a certain amount of storage space. There are several techniques and software that aid system administrators in identifying stale snapshots in terms of "unused" status, "created-time" information, or "created-by" flag, etc. However, none of these techniques and software are capable of identifying the amount of storage space that would be freed as a result of the deletion of snapshots, and as such, they cannot be used by system administrators to detect whether the deletion of selected snapshots would be sufficient to reach the goal for storage space that needs to be freed.

In general, different snapshots may share some storage locations between them. In such instances, a storage location would be freed (or marked as unused) only when all snapshots that point to the storage location are deleted. Thus, when fewer than all snapshots that point to a particular storage location is deleted, this would do nothing to free (or mark as unused) the storage location. The overlap between snapshots is most often non-transparent to system administrators, which makes it difficult for storage administrators to tell whether the deletion of selected snapshots would result in a sufficient amount of storage space being released.

The present disclosure provides an improved system utility for the management of snapshots that enables system administrators to find out the amount of storage space that would be released by the deletion of selected snapshots. The utility may have a graphical user interface (GUI) or a command-line interface. The introduction of the utility in a storage system is advantageous because it could shorten the time it takes system administrators to reach a certain goal for the freeing of storage space. In another aspect, the introduction of the tool is advantageous because it may prevent the deletion of snapshots that are better off being left alone (because their deletion would not result in the release of a significant or sufficient amount of space). In a storage system that includes thousands or tens of thousands of snapshots, the use of the utility can help save system administrators save a significant amount of time that would otherwise be spent on deleting snapshots in an ad-hoc manner.

In one respect, the utility allows system administrators to specify different snapshot sets and see how much space would free the deletion of each of the snapshot sets. In other words, the utility allows the system administrators to experiment with different sets of snapshots that could be potentially deleted until they arrive at a set whose deletion would result in freeing the desired amount of storage space.

In another respect, the utility may help system administrators identify those snapshots whose deletion would result in a maximum amount of space being released, thus maximizing the number of snapshots that would remain standing after the desired amount of storage space is released. Maximizing the number of snapshots that would remain standing is advantageous because it would make the storage system less susceptible to data loss (i.e., the more snapshots are available, the less likely the data loss, etc.).

FIG. 1 is a diagram of an example of a system 100, according to aspects of the disclosure. As illustrated, the system 100 may include a plurality of computing devices 130, a communications network 120, a storage array 110, and an array management system 132. Each of the computing devices 130 may include a smartphone, a desktop, a laptop, and/or any other device that might be used by a user to store and retrieve data from the storage array 110. The communications network 120 may include one or more of the Internet, a local area network (LAN), a wide area network (WAN), an InfiniBand network, a mobile data network, etc. The storage array 110 may include a plurality of storage processors 112 and a plurality of storage devices 114. Each of the storage devices 114 may include a Solid-State Drive (SSD), a Non-Volatile Memory Express (NVME) device, a hard disk, and/or any other suitable type of storage device. Each of the storage processors 112 may include a computing device, such as the computing device 700, which is discussed further below with respect to FIG. 7. Each of the storage processors 112 may be configured to receive I/O requests from the computing devices 130 and fulfill those requests by reading or writing data to the storage devices 114. The array management system 132 may include a computing system that is used by a system administrator to manage and configure the storage array 110.

Figure 2:
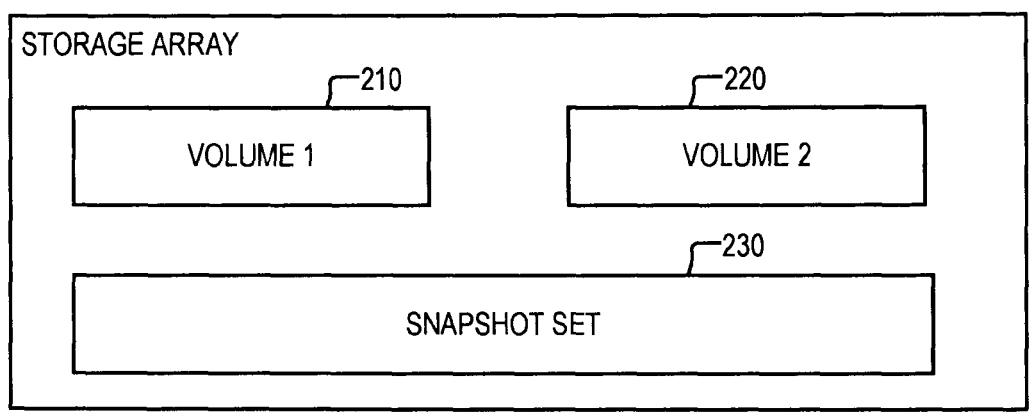
FIG. 2 is a diagram of an example of a storage array, according to aspects of the disclosure.

FIG. 2 is a diagram illustrating aspects of the operation of the storage array 110, according to aspects of the disclosure. As illustrated, the storage array 110 may implement volumes 210 and 220, as well as a snapshot set 230. According to the present example, the snapshot includes a plurality of snapshots, wherein each of the snapshots is a snapshot of volume 210 only. However, alternative implementations are possible in which the set 230 includes snapshots of both volume 210 and volume 220. In some implementations, the set 230 may be similar to the set shown in FIG. 4D.

Figure 3:
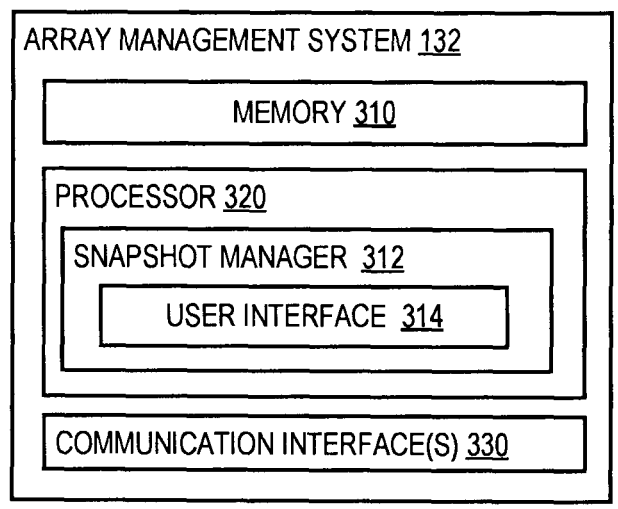
FIG. 3 is a diagram of an example of an array management system, according to aspects of the disclosure.

FIG. 3 is a diagram of the array management system 132. As illustrated, the array management system 132 may include a memory 310, a processor 320, and a communications interface 330. The memory 310 may include any suitable type of volatile and/or non-volatile memory, such as a solid-state drive (SSD), a hard disk (HD), a random-access memory (RAM), a Synchronous Dynamic Random-Access Memory (SDRAM), etc. The processor 320 may include any suitable type of processing circuitry, such as one or more of a general-purpose processor (e.g., an x86 processor, a MIPS processor, an ARM processor, etc.), a special-purpose processor, an application-specific integrated circuit (ASIC), a field programmable gate array (FPGA), etc. The communications interface 330 may include one or more of an Infini-Band adapter, an Ethernet adapter, a Bluetooth adapter, and/or any other suitable type of communications interface. The processor 320 may be configured to execute a snapshot manager 312. The snapshot manager 312 may include a user interface 314. In some implementations, the snapshot manager may include a user interface 314. According to the present example, the snapshot manager 312 is implemented in software. However, alternative implementations are possible in which the snapshot manager 312 is implemented in hardware or as a combination of software and hardware. In some implementations, the snapshot manager 312 may be configured to perform the processes discussed with respect to FIGS. 6A-C below. In some implementations, the user interface 314 may be the same or similar to any of the user interfaces discussed further below with respect to FIGS. 5A-F.

FIGS. 4A-D show diagrams illustrating aspects of the operation of the storage array according to aspects of the disclosure. Specifically, FIGS. 4A-D show different events that take place with respect to volume 210 and the snapshots of volume 210. For ease of explanation, volume 210 is depicted as including only five logical block addresses (LBAs). However, it will be understood that volume 210 may include a much larger number of LBAs. As is well-known, the LBAs in a volume normally point to respective physical locations in a storage device or RAID array where the data is stored. In the example of FIGS., the LBAs in volume 210 are denoted as "LBA 1," "LBA 2," "LBA 3," "LBA 4," and "LBA 5." The physical location where the data corresponding to each of the logical blocks is stored is indicated under the label for the logical block and preceded with the acronym "PA," which stands for "physical address." The number following the acronym "PA" is a unique number for the physical locations. So, the acronyms PA1, PA2, PA3, PA4, PA5, PA6, PA7, and PA8 identify different physical locations that are mapped to the logical block addresses of volume 210 at one time or another. As used throughout the disclosure, the phrase "LBA X points to PA Y" means that LBA X is mapped to PA Y and/or the data that is stored at LBA X is actually present in a physical storage location that is identifiable by physical address Y.

At time $T_1$, LBA 1 points to PA 1, LBA 2 points to PA 2, LBA 3 points to PA 3, LBA 4 points to PA 4, and LBA 5 points to PA 5.

At time $T_2$, the first snapshot (hereinafter referred to as "snap 1") of volume 210 is created. Snap 1, in this example, includes blocks (or portions) enumerated as "block 1," "block 2," "block 3," "block 4," and "block 5". Block 1 of snap 1 points to PA 1, block 2 of snap 1 points to PA 2, block 3 of snap 1 points to PA 3, block 4 of snap 1 points to PA 4, and block 5 of snap 1 points to PA 5. In the present example, the terms "block" and "LBA" both correspond to offsets from the beginning of volume 210 or its snapshots, so, in some respects, they may be regarded as referring to the same or a similar concept.

At time $T_3$, volume 210 is overwritten with new data. As a result, LBA 1 of volume 210 starts to point to PA 6. Therefore, at time $T_2$, snap 1 is no longer identical to volume 210 because block 1 of snap 1 points to PA 1, whereas LBA 1 of volume 210 points to PA 6.

At time $T_4$, the second snapshot (hereinafter referred to as "snap 2") of volume 210 is created. Block 1 of snap 2 points to PA 6, block 2 of snap 2 points to PA 2, block 3 of snap 2 points to PA 3, block 4 of snap 2 points to PA 4, and block 5 of snap 2 points to PA 5.

At time $T_5$, volume 210 is overwritten with new data. As a result, LBA 2 of volume 210 starts to point to PA 7. Therefore, at time $T_5$, snap 2 is no longer identical to volume 210 because block 2 of snap 2 points to PA 2, whereas LBA 2 of volume 210 points to PA 7. At time $T_5$, deleting snap 1 would release PA 1 because only this physical address (out of all physical addresses mapped to blocks in snap 1) is not pointed to by any of the LBAs in the volume 210 or any of the blocks in snap 2.

At time $T_6$, the third snapshot (hereinafter referred to as "snap 3") of volume 210 is created. Block 1 of snap 3 points to PA 6, block 2 of snap 3 points to PA 7, block 3 of snap 3 points to PA 3, block 4 of snap 3 points to PA 4, and block 5 of snap 3 points to PA 5.

At time $T_7$, volume 210 is overwritten with new data. As a result, LBA 2 of volume 210 starts to point to PA 8. Therefore, at time $T_7$, snap 3 is no longer identical to volume 210 because block 2 of snap 3 points to PA 7, whereas LBA 2 of volume 210 points to PA 8. At time $T_7$, deleting snap 3 would release PA 7 because this physical address is not referenced by volume 210 or any other snapshot of volume 210.

FIGS. 5A-F show diagrams of the user interface 314, which show one example of how the snapshot manager 312 might be used to manage the snapshots shown in FIG. 4D.

Figure 5A:
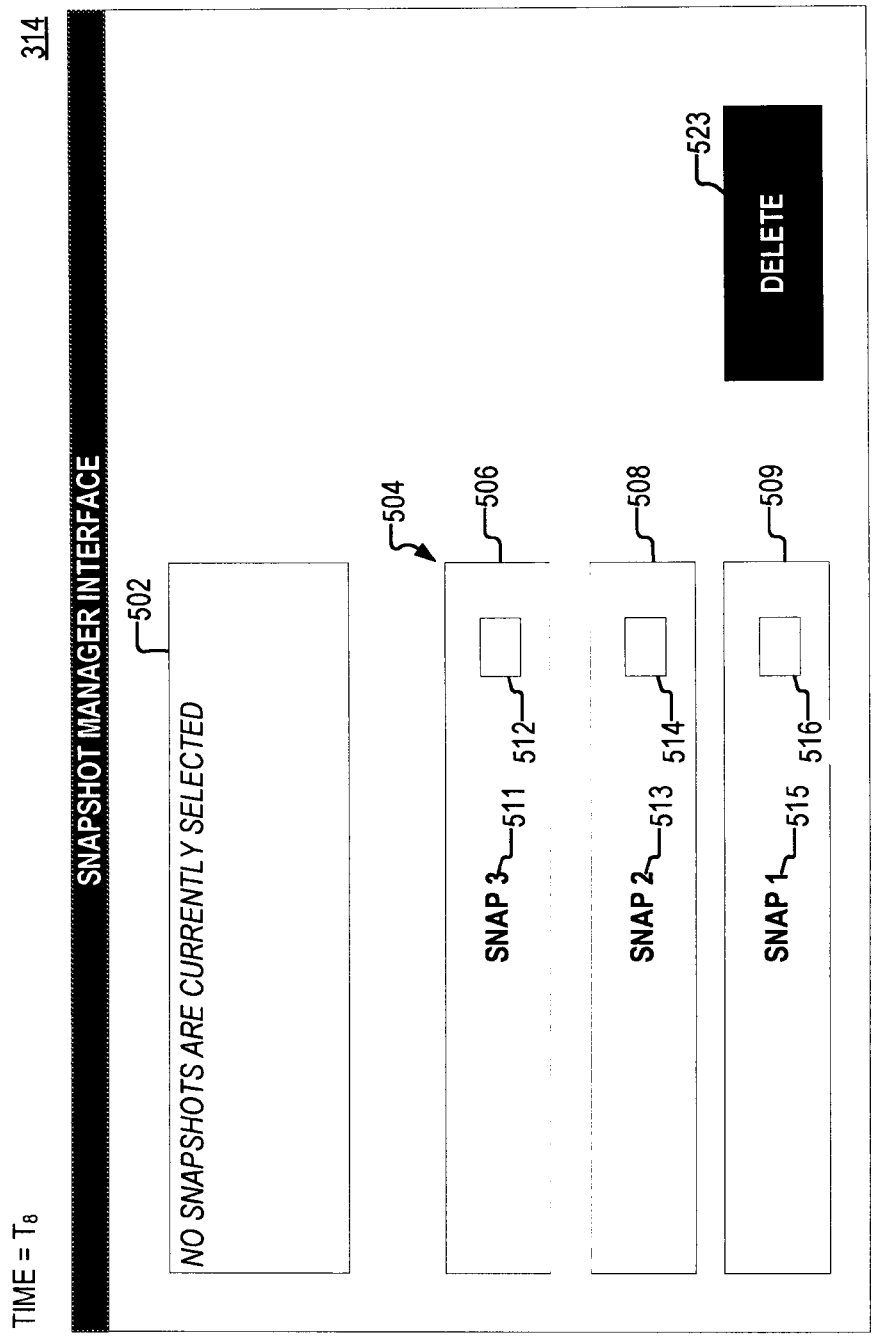
FIG. 5A is a diagram of an example of a graphical user interface of the system of FIG. 1, according to aspects of the disclosure.
Figure 5B:
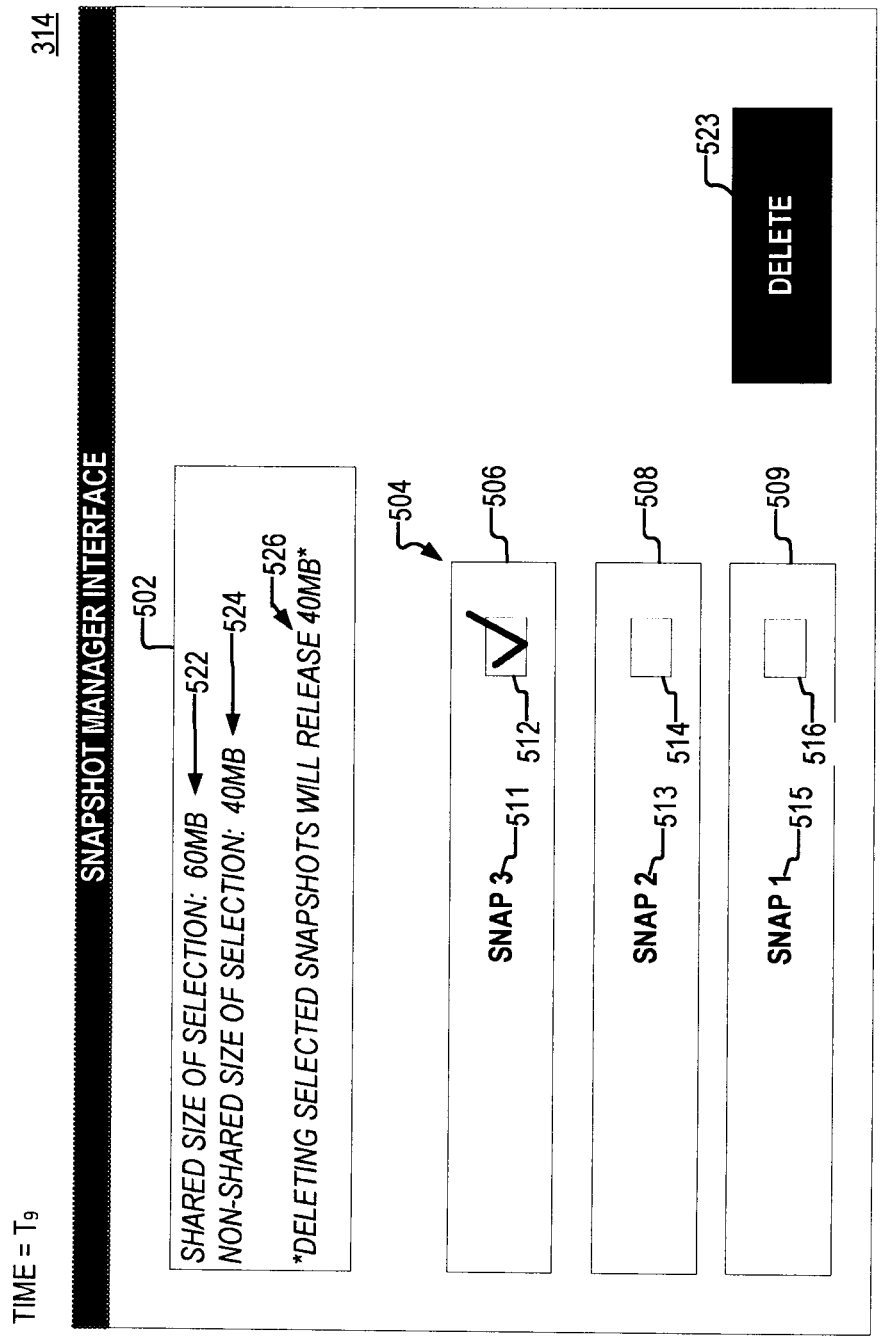
FIG. 5B is a diagram of an example of a user interface of the system of FIG. 1, according to aspects of the disclosure.
Figure 5C:
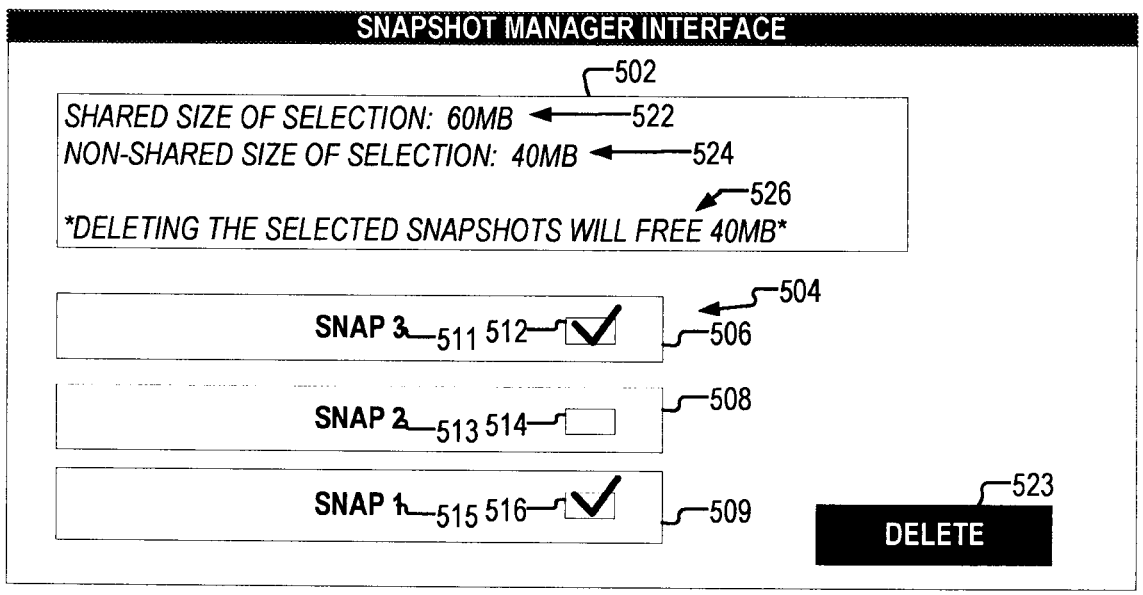
FIG. 5C is a diagram of an example of a user interface of the system of FIG. 1, according to aspects of the disclosure.
Figure 5D:
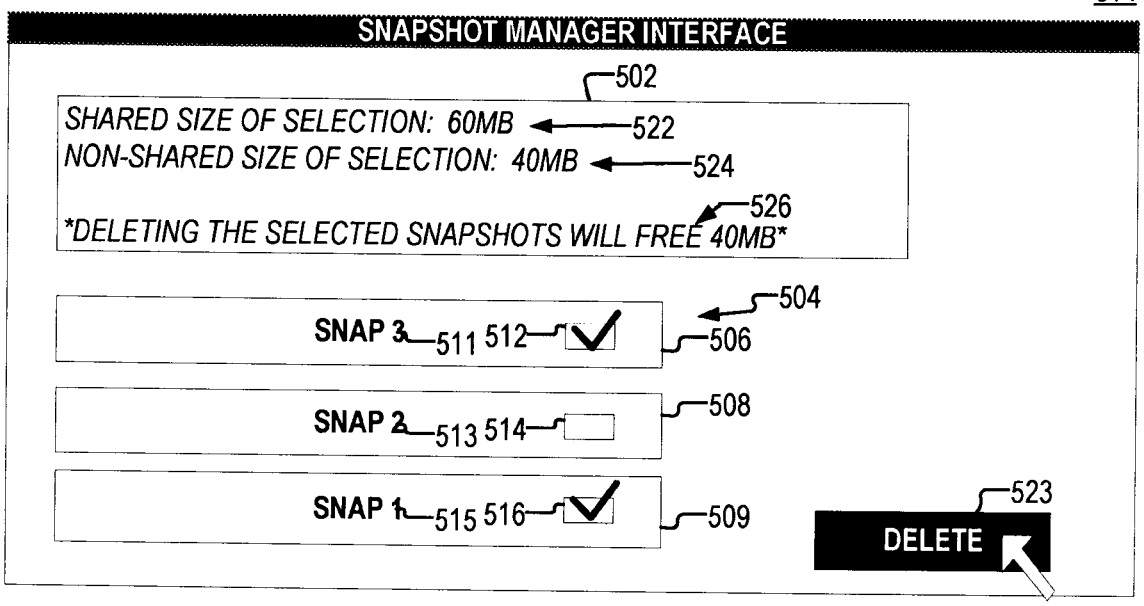
FIG. 5D is a diagram of an example of a user interface of the system of FIG. 1, according to aspects of the disclosure.

At time $T_8$, a system administrator starts the snapshot manager 312, and the user interface 314 is displayed. As illustrated, the user interface 314 may include a text field 502, a list 504, and a delete button 523. The list 504 may include multiple entries, where each entry corresponds to a different snapshot of volumes 210 and 220. Each entry may have a respective label identifying the corresponding snapshot and a respective input component for selecting the snapshot. In the present example, the input component is a checkbox. However, alternative implementations may use other suitable types of input components. Moreover, in some implementations, the input component may be omitted, and the snapshot can be selected by clicking on the label, for example. In the present example, text field 502 is used for presenting information to the user. However, alternative implementations may use other types of output components. The present disclosure is not limited to any specific type of output component for presenting information. In the example of FIG. 5A, entry 506 includes a label 511 indicating that it is associated with snap 3, and a checkbox 512 for selecting snap 3. Entry 508 includes a label 513 indicating that it is associated with snap 2, and a checkbox 514 for selecting snap 2. Entry 509 includes a label 515 indicating that it is associated with snap 1, and a checkbox 516 for selecting snap 1.

At time $T_9$, the system administrator selects snap 3 by activating checkbox 512. In response to activating checkbox 512, the snapshot manager 312 may execute processes 600A-C (shown in FIGS. 6A-C) and display indications 522, 524, and 526 in text field 502. Since, at time $T_9$, only snap 3 is selected, the selection that is made with the user interface 314 includes only snap 3. Indication 522 identifies the shared size of the selection. Indication 524 indicates the non-shared size of the selection. And indication 526 indicates the total amount of storage space that would be released if the selected snapshots (only snap 3 in this case) are deleted.

The shared size of the selection identifies the total amount of data in snap 3 (or a selection of multiple snapshots) that is shared with volume 210 and/or one or more snapshots of volume 210—i.e., data that is pointed to by other volumes or snapshots not included in the selection. In the present example, the shared size of the selection includes data stored at PA 6, PA 3, PA 4, and PA 4 because each of these physical addresses is mapped to one or more LBAs in volume 210 and/or one or more blocks in snap 1 and snap 2.

The non-shared size of the selection identifies the total amount of data that is part of the selected snapshots (i.e., snap 3 in this case) but is not part of volume 210 and/or any snapshots of volume 210 that are not part of the set of selected snapshots. In the present example, the non-shared size of the selection includes only the data stored at PA 7 because this physical address is not pointed to by volume 210 or any other snapshots of volume 210.

The amount of data that would be freed if the selection is deleted is equal to the non-shared size of the selection. Although in the example of FIG. 5B both indications 524 and 526 are displayed, alternative implementations are possible where only one of these indications is displayed.

As used herein, the term "indication" refers to text, images, sounds, and/or any other medium that can be used to communicate information. In the present example, it is assumed that each physical address holds 20 MB of data. However, this number is used for illustrative purposes only.

As is discussed further below, executing each of processes 600B and 600C would yield the non-shared size of a selection of snapshots and/or the amount of data that would be deleted. As can be readily appreciated, the shared size of a selection of a plurality of snapshots may be calculated by multiplying the cardinality of a first merged pointer set (produced at step 648 of process 600C), multiplying the cardinality by the block size of the selected snapshots, and subtracting the non-shared size from the resulting product.

At time $T_{10}$, the system administrator selects snap 1 by activating checkbox 516. After snap 1 is selected, the user selection of snapshots includes of both snap 1 and snap 3. In response to the selection of snap 1, indications 522, 524, and 526 are automatically updated (i.e., updated without the user providing further input beyond the activation of checkbox 516). Specifically, the indication 522 shows that the non-shared size of the selection is increased by 20 MB because block 2 of snap 3 points to PA 7, which can be deleted because no other non-selected snapshot or volume 210 points to PA 7.

At time $T_{11}$, the system administrator presses the delete button 523.

At time $T_{12}$, in response to the delete button 523 being pressed, the snapshot manager 312 deletes the selected snapshots (i.e., snap 1 and snap 3) and updates the list 504. According to the present example, updating the list 504 includes hiding the entries that correspond to the deleted snapshots (i.e., hiding entries 506 and 509). Furthermore, in some implementations, pressing the delete button 523 may also clear indications 522, 524, and 526 from the text field 502. In other words, pressing the delete button 523 may trigger the following actions: (i) deletion of selected snapshots, (ii) hiding/removal from list 504 of the entries that correspond to the deleted snapshots, and (iii) hiding/removal of indications 522, 524, and 526 from the text field 502.

Figures 5E, 5F:
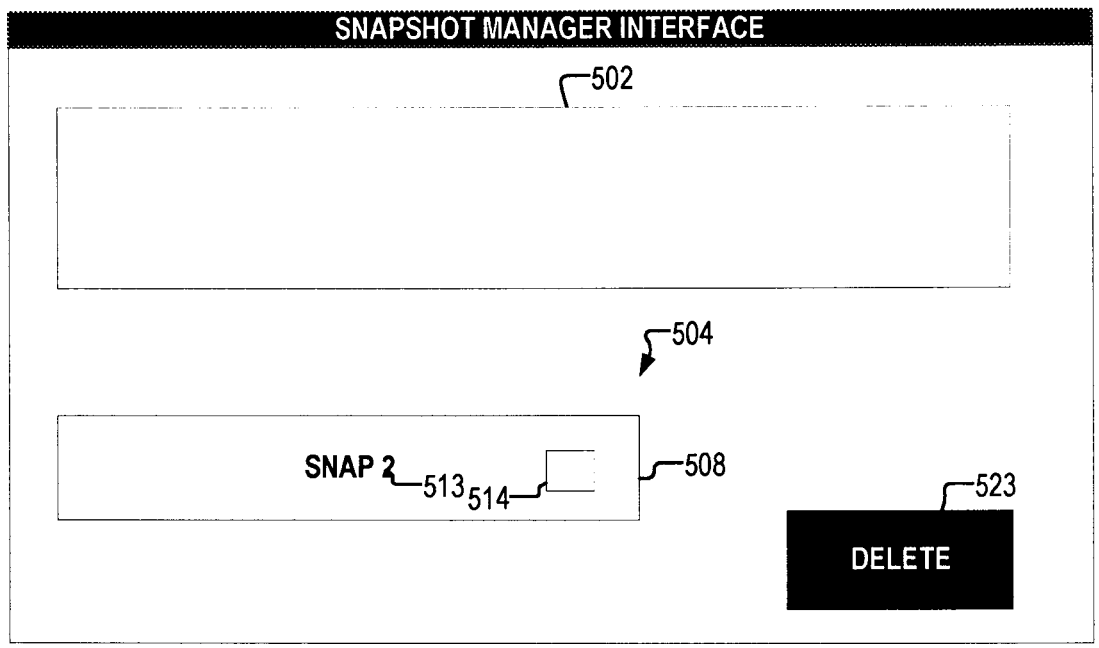
FIG. 5E is a diagram of an example of a user interface of the system of FIG. 1, according to aspects of the disclosure.
FIG. 5F is a diagram of an example of a user interface of the system of FIG. 1, according to aspects of the disclosure.

FIG. 5F shows an example in which the user interface 314 is implemented as a command-line interface. At line 562, the system administrator selects snap 1 and snap 2. At line 564, the snapshot manager 312 displays an indication of the amount of storage space that would be freed up if the snapshots selected at line 564 were to be deleted. In some implementations, the snapshot manager 312 may execute processes 600A-C (shown in FIGS. 6A-C) in response to line 562, and the amount of storage space that would be freed up may be calculated as a result of executing processes 600A-B. Additionally, at line 564, the snapshot manager 312 presents the system administrator (i.e., user) with a prompt asking whether the system administrator would like to proceed with the deletion of the snapshots selected at line 562. At line 566, the system administrator indicates willingness to proceed with the deletion. In response to the input provided at line 566, the snapshot manager 312 deletes the snapshots selected at line 562. At line 568, the snapshot manager 312 displays a confirmation that the selected snapshots have been deleted.

Figure 6A:
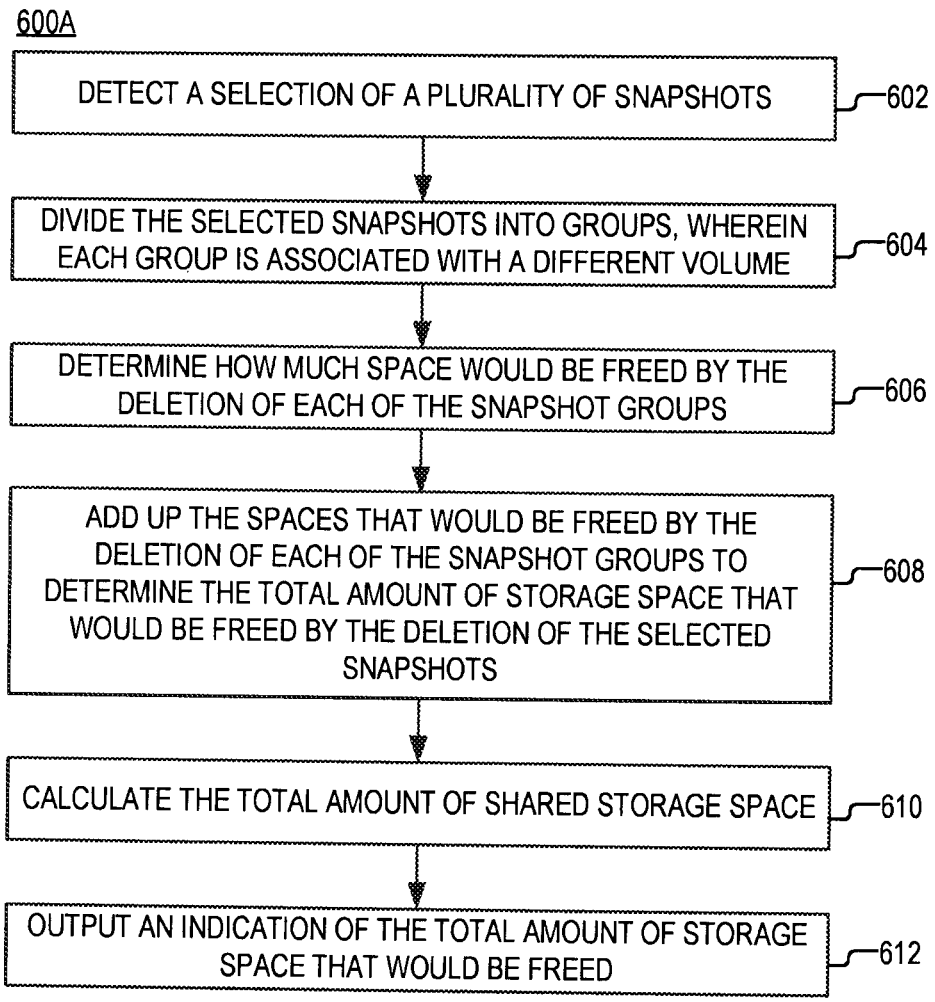
FIG. 6A is a flowchart of an example of a process, according to aspects of the disclosure.

FIG. 6A is a flowchart illustrating an example of process 600A, according to aspects of the disclosure.

At step 602, the snapshot manager 312 detects the selection of a plurality of snapshots. In some implementations, the selection may be made in the manner discussed above with respect to FIGS. 5A-F.

At step 604, the snapshot manager 312 divides the selected snapshots into groups, where each group includes snapshots of a different volume. If the multiple snapshots (selected at step 602) include snapshots of both volume 210 and volume 220, the snapshots would be divided into a first group containing only snapshots of volume 210 and a second group containing only snapshots of volume 220.

At step 606, the snapshot manager 312 determines the amount of space that would be freed by deleting each of the snapshot groups. In some implementations, the snapshot manager 312 may execute one of processes 600B-C (shown in FIGS. 6B-C) for each snapshot group to determine the space that would be freed by deleting that group. For example, if the snapshots are divided into two groups, the snapshot manager 312 may execute process 600B twice, once for each group, and so on.

At step 608, the snapshot manager 312 calculates the total amount of storage space that would be freed by deleting the snapshot groups identified at step 604. For instance, if two snapshot groups are identified at step 604, the snapshot manager 312 may calculate the sum of the amount of storage space that would be freed by deleting the first group and the amount of storage space that would be freed by deleting the second group. If only one group is identified at step 604, step 608 would be omitted because the amount of storage space that would be deleted by the group would be to total amount of storage space that is going to be freed.

At step 610, the snapshot manager 312 calculates the total amount of shared space for the selected snapshots at step 602. In some implementations, this calculation involves subtracting the value calculated at step 608 from the total amount of storage space occupied by the selected snapshots. If only one group of snapshots is identified at step 604, the total amount of storage space can be calculated by subtracting the amount of storage space that would be freed by deleting the selected snapshots from the total amount of storage space occupied by the snapshots.

At step 612, the snapshot manager outputs either the value calculated at step 608 or the value calculated at step 610, or both. The output values can be presented as discussed earlier in FIGS. 5A-F.

Figure 6B:
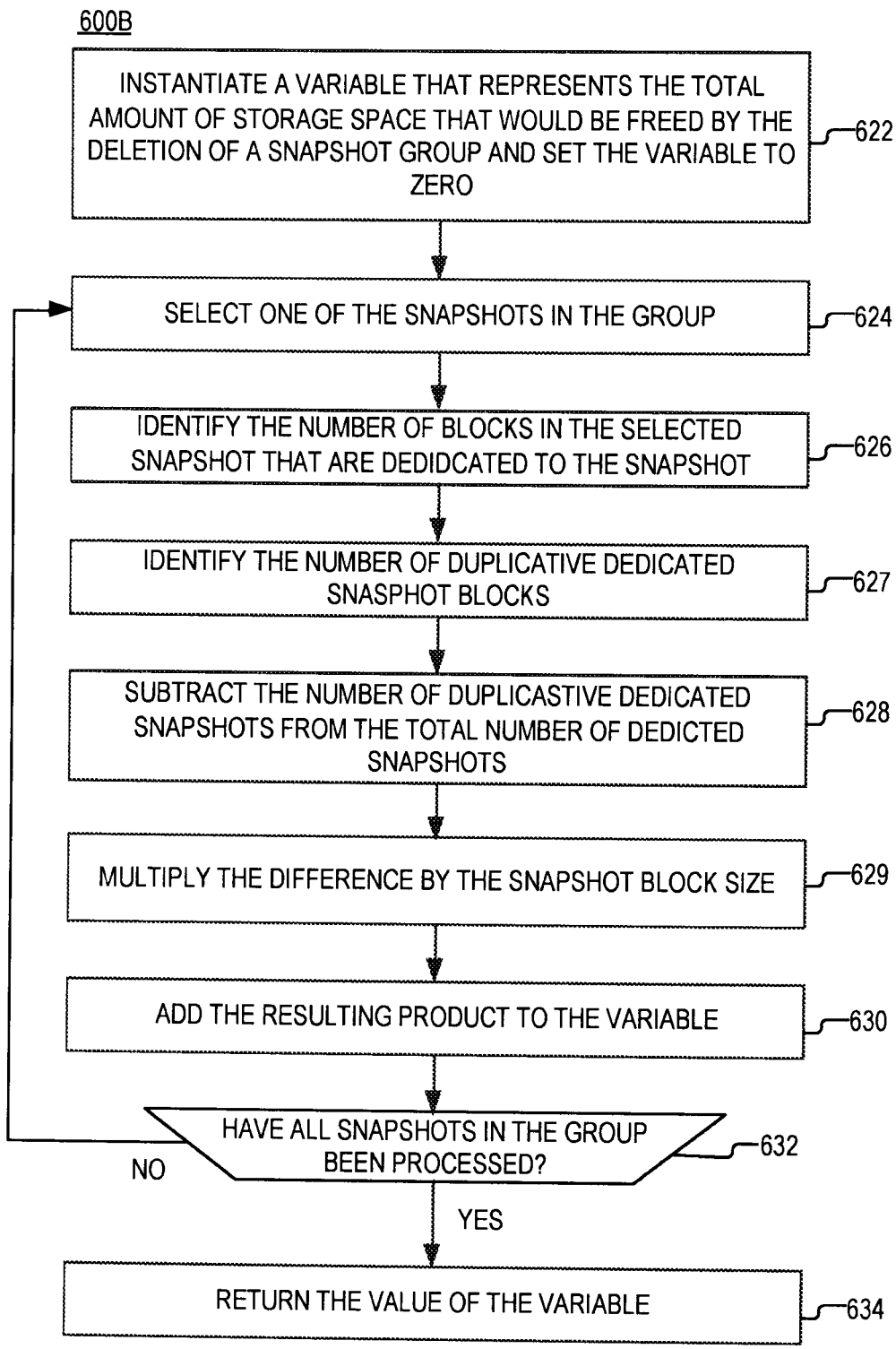
FIG. 6B is a flowchart of an example of a process, according to aspects of the disclosure.

FIG. 6B is a flowchart illustrating an example process for calculating the amount of space that would be freed by deleting a group of selected snapshots.

At step 622, the snapshot manager 312 initializes a variable representing the total amount of storage space that would be freed by deleting the group of snapshots. In this example, the snapshots are selected in chronological order from oldest to newest. In this example, the group is the same as the group of selected snapshots shown in FIG. 4D.

At step 624, the snapshot manager 312 selects one of the snapshots in the group that has not been selected in any previous iteration of steps 624-630.

At step 626, snapshot manager 312 identifies the number of blocks in the selected snapshot that are dedicated to that snapshot. In this context, a snapshot block is considered dedicated if the physical address it points to is not referenced by any volume or other snapshot outside the selected group. For example, in FIG. 4D, if only snap 2 is selected, only block 1 would be a dedicated block. However, if both snaps 1 and 2 are selected, block 1 of snap 1 would be a dedicated block, block 2 of snap 1 would be a dedicated block, and block 2 of snap 2 would be a dedicated block. Similarly, if snaps 1, 2, and 3 are selected, block 1 of snap 1, block 2 of snap 1, block 2 of snap 2, block 1 of snap 3, and block 7 of snap 3 would all be dedicated blocks.

At step 627, the snapshot manager 312 identifies the number of duplicate dedicated blocks within the set of dedicated blocks determined at step 626. A duplicate block is a block that is pointed to by more than one snapshot in the group, but not referenced by any volume or snapshot outside the group. Additionally, for a snapshot to be considered duplicative, it must have already been used in the calculations performed during a previous iteration of steps 627-629.

Let's consider an example where the group of snapshots includes snaps 1, 2, and 3 (as shown in FIG. 4D). As mentioned earlier, snaps 1, 2, and 3 would be selected in chronological order from oldest to newest during step 624. Therefore, snap 1 is selected first, followed by snap 2, and finally snap 3. Steps 624-630 are executed for each selected snapshot.

When snap 1 is processed, blocks 1 and 2 of snap 1 are identified as dedicated blocks, and none of them are considered duplicative. Therefore, at step 627, zero is subtracted from the total number of dedicated blocks (which is 2). The resulting difference (which is 2) is multiplied by the snapshot block size at step 628, and the product is added to the variable instantiated at step 622.

When snap 2 is processed, blocks 1 and 2 of snap 2 are considered dedicated blocks. However, since block 2 of snap 2 points to the same physical address as block 2 of snap 1, and block 2 of snap 1 has already been used in the calculations during the processing of snap 1, block 2 of snap 2 is considered duplicative. Therefore, at step 627, 1 is subtracted from the total number of dedicated blocks in snap 2 (which is 2). The resulting difference (which is 1) is multiplied by the snapshot block size at step 628, and the product is added to the variable instantiated at step 622.

When snap 3 is processed, blocks 1 and 2 of snap 3 are considered dedicated blocks. However, since block 1 of snap 3 points to the same physical address as block 1 of snap 2, and block 1 of snap 2 has already been used in the calculations performed during the processing of snap 2, block 1 of snap 3 is considered duplicative. Therefore, at step 627, the number 1 is subtracted from the total number of dedicated blocks in snap 3 (which is 2). The resulting difference (which is 1) is multiplied by the snapshot block size at step 628, and the product is added to the variable instantiated at step 622.

In short, by identifying duplicative snapshot blocks and subtracting the number of duplicative blocks from the total number of dedicated blocks, the storage space that would be freed by deleting multiple blocks pointing to the same physical address is not double-counted.

At step 628, the snapshot manager 312 subtracts the value identified at step 627 from the value identified at step 626.

At step 629, the snapshot manager 312 multiplies the value calculated at step 628 by the block size of the snapshot selected at step 624. The block size represents the amount of data that would be freed if the block was deleted. In other words, it corresponds to the size of the page (or another storage unit) identified by the physical address pointed to by the block.

At step 630, the snapshot manager 312 updates the variable instantiated at step 622 by adding the value calculated at step 629 (i.e., variable+=value_calculated_at_step_628).

At step 632, snapshot manager 312 determines if all snapshots in the group have been processed. If not, process 600B returns to step 624 to select and process another snapshot. If all snapshots in the group have been processed, the process proceeds to step 634.

At step 634, process 600B returns the value of the variable instantiated at step 622.

Figure 6C:
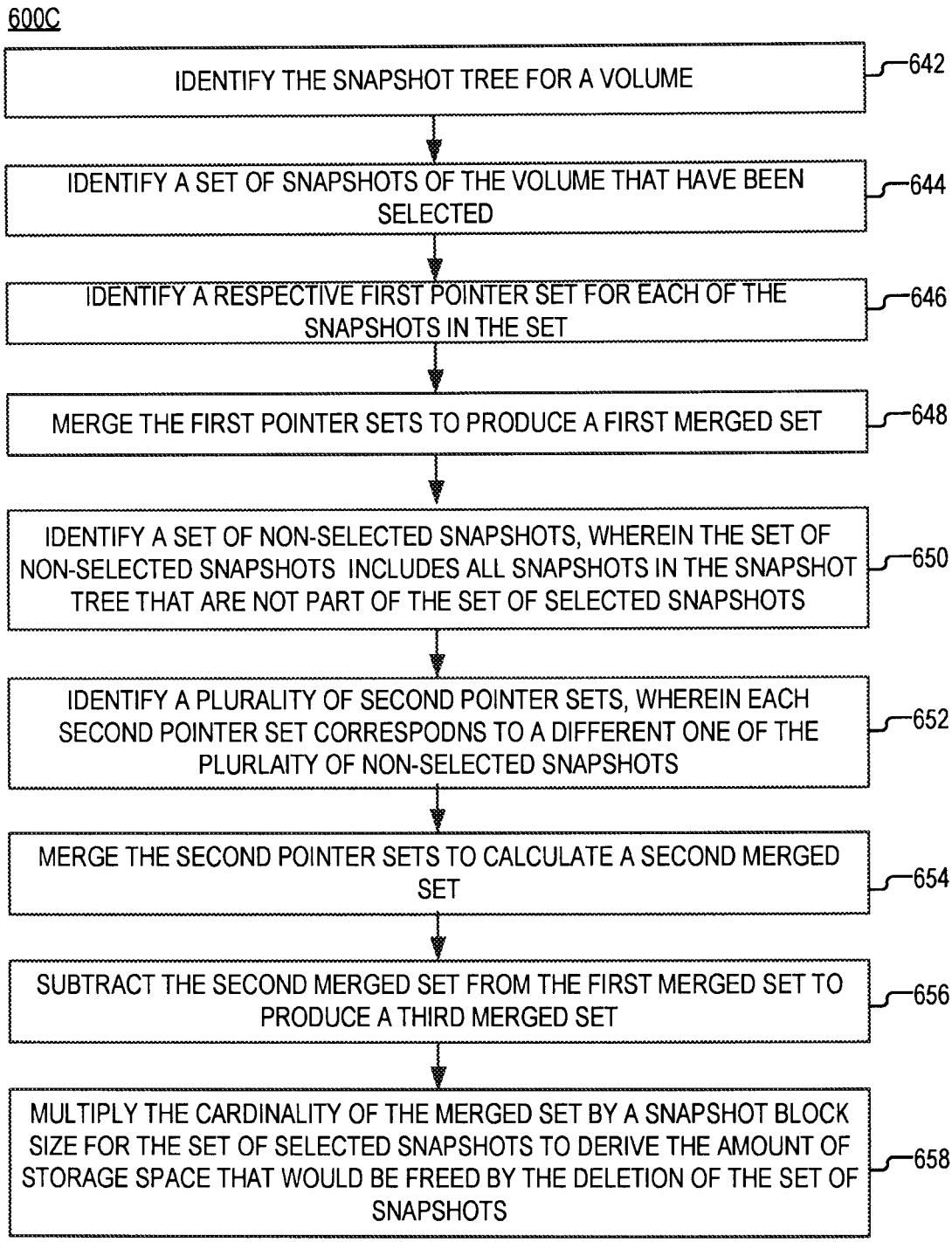
FIG. 6C is a flowchart of an example of a process, according to aspects of the disclosure.

FIG. 6C is a flowchart illustrating an example of a process, 600C, for calculating the amount of space that would be freed by deleting a group of selected snapshots. In this example, the process 600C is performed by the snapshot manager, but the present disclosure is not limited to this implementation.

At step 642, the snapshot tree for a volume is identified. In this example, the snapshot tree for volume 210 is specifically identified. At step 644, a set of selected snapshots of the volume is identified. This set includes snaps 1, 2, and 3, all of which are shown in FIG. 4D. At step 646, a different respective first pointer set is identified for each of the selected snapshots. A first pointer set for a selected snapshot includes multiple pointers, where each pointer corresponds to a different block within the snapshot and points to a specific physical address associated with that block. At step 648, the first pointer sets identified in step 646 are merged to create a first merged pointer set. At step 650, a set of non-selected snapshots is identified. This set includes all the snapshots in the pointer tree that are not part of the selected snapshots set. At step 652, a plurality of second pointer sets is identified, where each second pointer set corresponds to a different snapshot in the set of non-selected snapshots. At step 654, the plurality of second pointer sets is merged to produce a second merged set. At step 656, the second merged set is subtracted from the first merged set to create a third merged set. At step 658, the cardinality (i.e., the number of elements) of the third merged set is multiplied by the snapshot block size of the selected snapshots, resulting in the total amount of storage space that would be freed if the selected snapshots are deleted.

Figure 7:
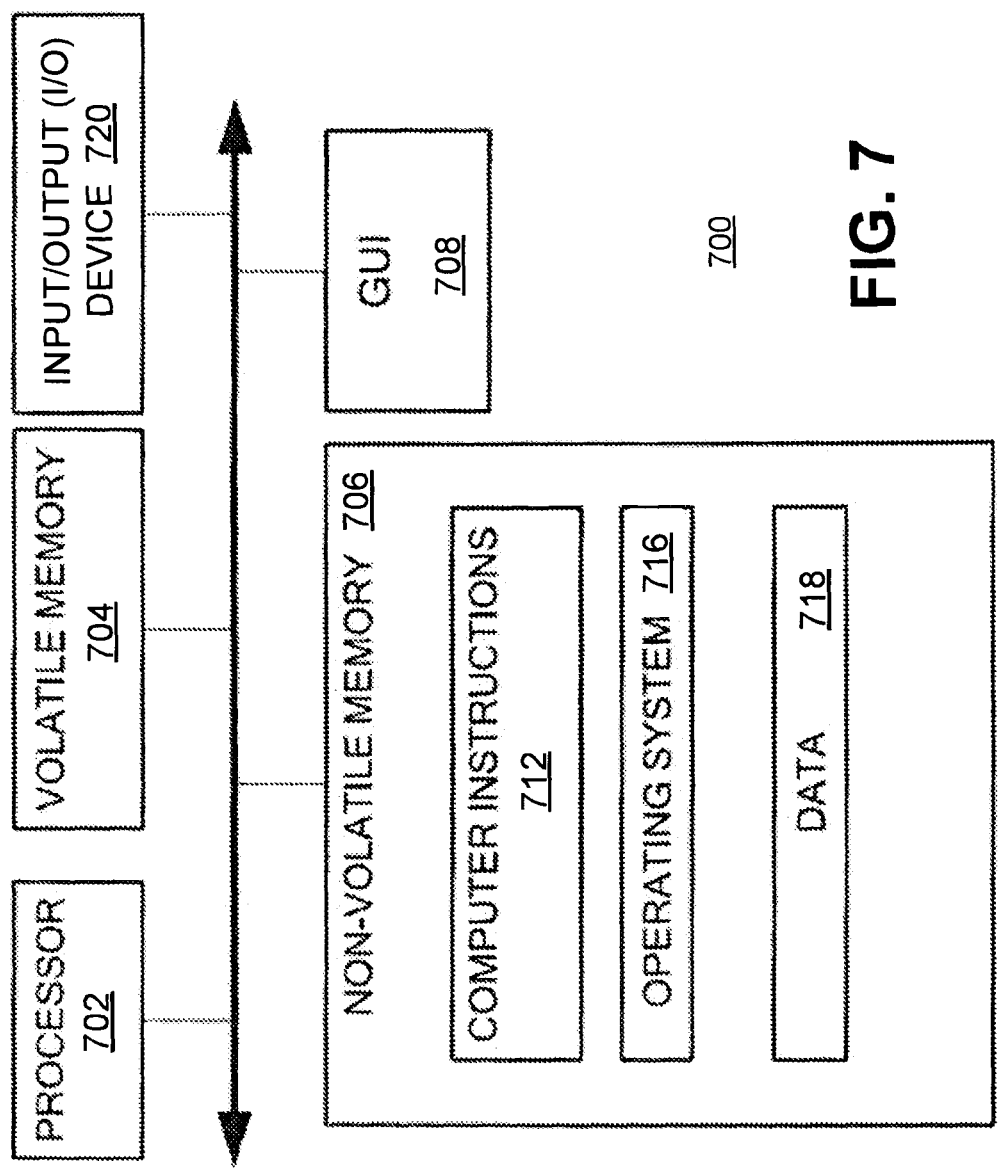
FIG. 7 is a diagram of an example of a computing device, according to aspects of the disclosure.

Referring to FIG. 7, in some embodiments, a device 700 may include processor 702, volatile memory 704 (e.g., RAM), non-volatile memory 706 (e.g., a hard disk drive, a solid-state drive such as a flash drive, a hybrid magnetic and solid-state drive, etc.), graphical user interface (GUI) 708 (e.g., a touchscreen, a display, and so forth) and input/output (I/O) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704. Program code may be applied to data entered using an input device of GUI 708 or received from I/O device 720.

FIGS. 1-7 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments. (1/23)

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
    displaying, in a user interface, a snapshot list, the snapshot list identifying a plurality of snapshots of a set of one or more volumes;
    detecting a first user input selecting one or more of the plurality of snapshots;
    identifying one or more non-selected snapshots that are part of a same snapshot tree as the selected snapshots, the non-selected snapshots including all snapshots in the snapshot tree other than the selected snapshots;
    identifying plurality of first pointer sets, each first point set corresponding to a different one of the selected snapshots, each of the first pointer sets including a plurality of pointers that correspond to different blocks within the first pointer set's corresponding selected snapshot;
    identifying plurality of second pointer sets, each second point corresponding to a different one of the non-selected snapshots, each of the second pointer sets including a plurality of pointers that correspond to different blocks within the second pointer set's corresponding non-selected snapshot;
    merging the plurality of first pointer sets to produce a first merged pointer set;
    merging the plurality of second pointer sets to produce a second merged pointer set;
    subtracting the second merged pointer set from the first merged pointer set to produce a third merged pointer set;
    using a size of the third merged pointer set to calculate a total amount of storage space that would be freed if the selected snapshots were to deleted; and
    displaying, in the user interface, an indication of the total amount of storage space that would be freed if the selected snapshots were to be deleted.

2. The method of claim 1, wherein using the size of the third merged pointer set to calculate the total amount of storage space that would be freed includes multiplying a cardinality of the third merged pointer set by a block size for the selected snapshots.

3. The method of claim 1, wherein displaying the snapshot list includes displaying a plurality of input components, each of the input components corresponding to a different one of the plurality of snapshots, wherein the first user input includes an activation of each of the plurality of input components that correspond to the selected snapshots.

4. The method of claim 1, further comprising, receiving a second user input requesting deletion of the selected snapshots, and deleting the selected snapshots in response to the second user input.

5. The method of claim 1, further comprising:
    displaying, in the user interface, an indication of a total amount of shared storage space which would not be freed if the selected snapshots were to be deleted, the shared storage space being shared between: (i) at least one of the selected snapshots and (ii) any of the set of one or more volumes and/or any of the plurality of snapshots that are not selected,
    wherein the shared storage space includes a plurality of physical memory locations, each of the plurality of physical memory locations being referenced by: (i) at least one of the selected snapshots and (ii) any of the set of one or more volumes and/or any of the plurality of snapshots that are not selected.

6. The method of claim 1, further comprising, displaying, in the user interface, an indication of a size of shared storage space that is occupied by the selected snapshots.

7. The method of claim 1, wherein the user interface includes one of a graphical user interface or a command-line interface.

8. A system, comprising:
a memory; and
at least one processor that is operatively coupled to the memory, the at least one processor being configured to perform the operations of:
displaying, in a user interface, a snapshot list, the snapshot list identifying a plurality of snapshots of a set of one or more volumes;
detecting a first user input selecting one or more of the plurality of snapshots;
identifying one or more non-selected snapshots that are part of a same snapshot tree as the selected snapshots, the non-selected snapshots including all snapshots in the snapshot tree other than the selected snapshots;
identifying plurality of first pointer sets, each point set corresponding to a different one of the selected snapshots, each of the first pointer sets including a plurality of pointers that correspond to different blocks within the first pointer set's corresponding selected snapshot;
identifying plurality of second pointer sets, each second point set corresponding to a different one of the non-selected snapshots, each of the second pointer sets including a plurality of pointers that correspond to different blocks within the second pointer set's corresponding non-selected snapshot;
merging the plurality of first pointer sets to produce a first merged pointer set;
merging the plurality of second pointer sets to produce a second merged pointer set;
subtracting the second merged pointer set from the first merged pointer set to produce a third merged pointer set;
using a size of the third merged pointer set to calculate a total amount of storage space that would be freed if the selected snapshots were to be deleted; and
displaying, in the user interface, an indication of the total amount of storage space that would be freed if the selected snapshots were to be deleted.

9. The system of claim 8, wherein using the size of the third merged pointer set to calculate the total amount of storage space that would be freed includes multiplying a cardinality of the third merged pointer set by a block size for the selected snapshots.

10. The system of claim 8, wherein displaying the snapshot list includes displaying a plurality of input components, each of the input components corresponding to a different one of the plurality of snapshots, wherein the first user input includes an activation of each of the plurality of input components that correspond to the selected snapshots.

11. The system of claim 8, wherein the at least one processor is further configured to perform the operation of receiving a second user input requesting deletion of the selected snapshots, and deleting the selected snapshots in response to the second user input.

12. The system of claim 8, wherein:
the at least one processor is further configured to perform the operation of displaying, in the user interface, an indication of a total amount of shared storage space which would not be freed if the selected snapshots were to be deleted, the shared storage space being shared between: (i) at least one of the selected snapshots and (ii) any of the set of one or more volumes and/or any of the plurality of snapshots that are not selected, and
the shared storage space includes a plurality of physical memory locations, each of the plurality of physical memory locations being referenced by: (i) at least one of the selected snapshots and (ii) any of the set of one or more volumes and/or any of the plurality of snapshots that are not selected.

13. The system of claim 8, further comprising, wherein the at least one processor is further configured to perform the operation of displaying, in the user interface, an indication of a size of shared storage space that is occupied by the selected snapshots.

14. The system of claim 8, wherein the user interface includes one of a graphical user interface or a command-line interface.

15. A non-transitory computer-readable medium storing one or more processor-executable instructions, which, when executed by at least one processor, cause the at least one processor to perform the operations of:
displaying, in a user interface, a snapshot list, the snapshot list identifying a plurality of snapshots of a set of one or more volumes;
detecting a first user input selecting one or more of the plurality of snapshots;
identifying one or more non-selected snapshots that are part of a same snapshot free as the selected snapshots, the non-selected snapshots including all snapshots in the snapshot tree other than the selected snapshots;
identifying plurality of first pointer sets, each first point set corresponding to a different one of the selected snapshots, each of the first pointer sets including a plurality of pointers that correspond to different blocks within the first pointer set's corresponding selected snapshot;
identifying plurality of second pointer sets, each second point set corresponding to a different one of the non-selected snapshots, each of the second pointer sets including a plurality of pointers that correspond to different blocks within the second pointer set's corresponding non-selected snapshot;
merging the plurality of first pointer sets to produce a first merged pointer set;
merging the plurality of second pointer sets to produce a second merged pointer set;
subtracting the second merged pointer set from the first merged pointer set to produce a third merged pointer set;
using a size of the third merged pointer set to calculate a total amount of storage space that would be freed if the selected snapshots were to be deleted; and
displaying, in the user interface, an indication of the total amount of storage space that would be freed if the selected snapshots were to be deleted.

16. The non-transitory computer-readable medium of claim 15, wherein using the size of the third merged pointer set to calculate the total amount of storage space that would be freed includes multiplying a cardinality of the third merged pointer set by a block size for the selected snapshots.

17. The non-transitory computer-readable medium of claim 15, wherein displaying the snapshot list includes displaying a plurality of input components, each of the input components corresponding to a different one of the plurality of snapshots, wherein the first user input includes an activation of each of the plurality of input components that correspond to the selected snapshots.

18. The non-transitory computer-readable medium of claim 15, wherein the operations further include receiving a second user input requesting deletion of the selected snapshots, and deleting the selected snapshots in response to the second user input.

19. The non-transitory computer-readable medium of claim 15, wherein:
- the operations further include displaying, in the user interface, an indication of a total amount of shared storage space which would not be freed if the selected snapshots were to be deleted, the shared storage space being shared between: (i) at least one of the selected snapshots and (ii) any of the set of one or more volumes and/or any of the plurality of snapshots that are not selected, and
- the shared storage space includes a plurality of physical memory locations, each of the plurality of physical memory locations being referenced by: (i) at least one of the selected snapshots and (ii) any of the set of one or more volumes and/or any of the plurality of snapshots that are not selected.

20. The non-transitory computer-readable medium of claim 15, wherein the operations further include, displaying, in the user interface, an indication of a size of shared storage space that is occupied by the selected snapshots.

* * * * *